(12) United States Patent
DeBusk

(10) Patent No.: US 7,556,735 B1
(45) Date of Patent: *Jul. 7, 2009

(54) PLANT BIOMASS MANAGEMENT SYSTEM AND METHOD

(76) Inventor: Thomas A. DeBusk, 3208 Westchester Dr., Cocoa, FL (US) 32926

( * ) Notice: Subject to any disclaimer, the term of this patent is extended or adjusted under 35 U.S.C. 154(b) by 0 days.

This patent is subject to a terminal disclaimer.

(21) Appl. No.: 11/865,911

(22) Filed: Oct. 2, 2007

Related U.S. Application Data

(60) Provisional application No. 60/827,792, filed on Oct. 2, 2006.

(51) Int. Cl.
*C02F 3/32* (2006.01)
*B09C 1/00* (2006.01)

(52) U.S. Cl. .................. 210/602; 210/747; 405/128.15

(58) Field of Classification Search .................. 210/602, 210/747, 170.01, 170.08; 405/36, 128.15
See application file for complete search history.

(56) References Cited

U.S. PATENT DOCUMENTS

| | | | |
|---|---|---|---|
| 4,188,154 | A | 2/1980 | Izatt |
| 5,282,694 | A | 2/1994 | Kovacs et al. |
| 5,472,472 | A | 12/1995 | Northrop |
| 5,520,253 | A | 5/1996 | Kesting |
| 5,733,453 | A | 3/1998 | DeBusk |
| 5,766,474 | A | 6/1998 | Smith et al. |
| RE35,989 | E * | 12/1998 | Hubbs et al. ............. 47/58.1 R |
| 5,863,433 | A | 1/1999 | Behrends |
| 5,897,946 | A | 4/1999 | Nachtman et al. |
| 5,993,649 | A | 11/1999 | DeBusk et al. |
| 6,322,699 | B1 | 11/2001 | Fernandez |
| 6,413,426 | B1 | 7/2002 | DeBusk et al. |
| 6,692,641 | B2 | 2/2004 | DeBusk et al. |
| 6,893,567 | B1 | 5/2005 | Vanotti et al. |
| 7,074,330 | B1 | 7/2006 | DeBusk |

OTHER PUBLICATIONS

Lake Apopka Water Hyacinth Demonstration Project, Second Semi-Annual Report prepared for St. Johns River Water Management District, prepared by Amasek, Inc., Apr. 4, 1991.

DeBusk et al., "Effectiveness of Mechanical Aeration in Floating Aquatic Macrophyte-Based Wastewater Treatment Systems," Journal of Environmental Quality, vol. 18, No. 3, pp. 349-354, Jul.-Sep. 1989.

Clark, Mark, "Biophysical Characterization of Floating Wetlands (Flotant) and Vegetative Succession of a Warm-Temperature Aquatic Ecosystem," Dissertation, University of Florida, 2000.

(Continued)

*Primary Examiner*—Fred Prince
(74) *Attorney, Agent, or Firm*—Jacqueline E. Hartt, Ph.D.; Lowndes, Drosdick, Doster, Kantor & Reed, P.A.

(57) ABSTRACT

A method is provided that can amend treatment wetland soils and sediments in order to reduce pollutant export following the use of the wetland for contaminant removal. The method includes the steps of draining at least a portion of a water body and permitting the growth of vegetation on the sediments. Once grown, the resulting biomass is tilled into the soil, and the water body is permitted to re-hydrate. In some instances a portion of the vegetation can be harvested prior to tilling remaining crop residues into the soil. In another embodiment, the draining step occurs naturally.

17 Claims, 1 Drawing Sheet

OTHER PUBLICATIONS

Wen, Li and Recknagel, Friedrich, "In Situ Removal of Dissolved Phosphorus in Irrigation Drainage Water by Planted Floats: Preliminary Results from Growth Chamber Experiment," Agriculture, Ecosystems and Environment, vol. 90, pp. 9-15, Jun. 2002.

Kim, Youngchul and Kim, Wan-Joong, "Roles of Water Hyacinths and Their Roots for Reducing Algal Concentration in the Effluent from Waste Stabilization Ponds," Water Research, vol. 34, No. 13, pp. 3285-3294, Sep. 1, 2002.

* cited by examiner

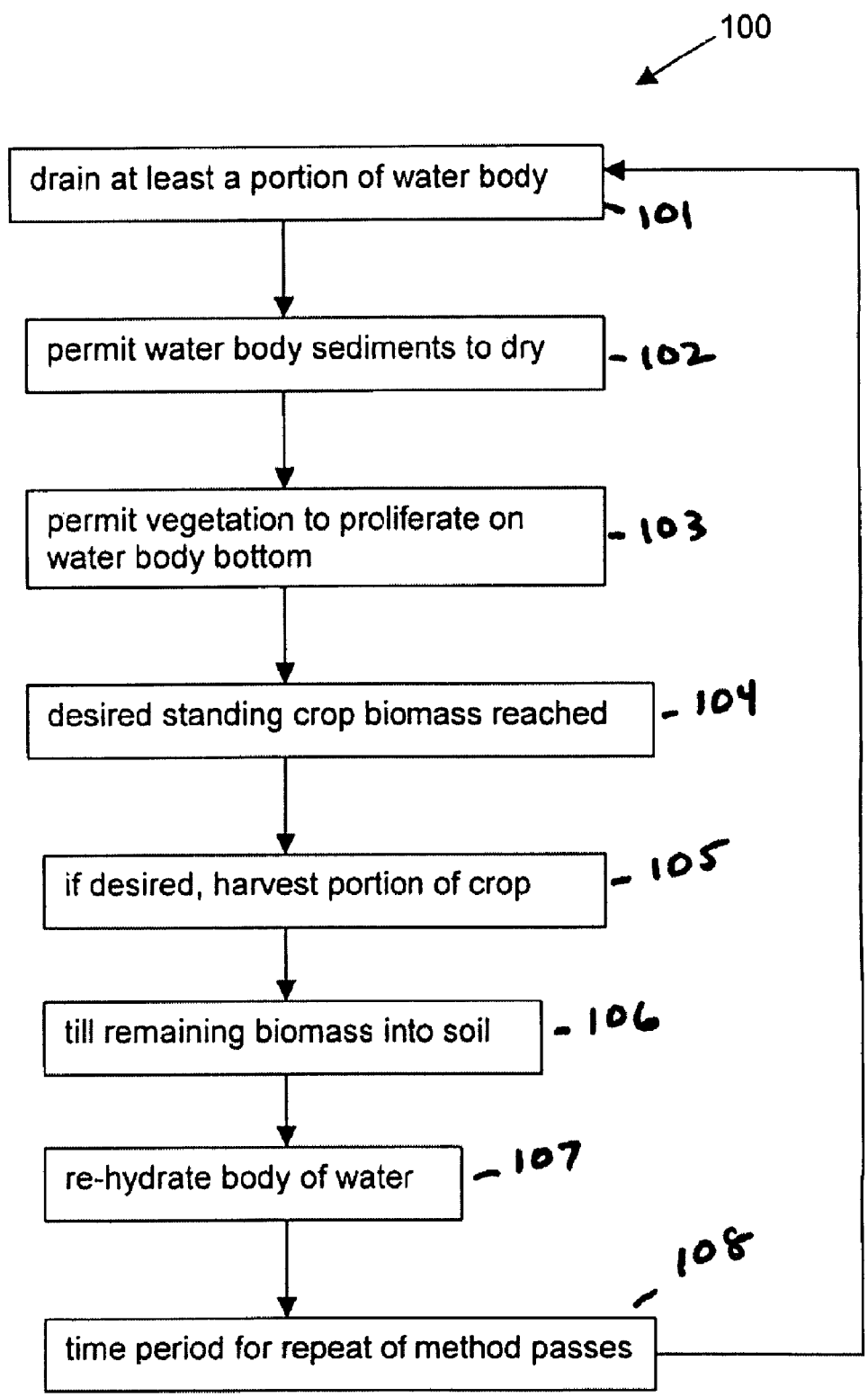
THE FIGURE

PLANT BIOMASS MANAGEMENT SYSTEM AND METHOD

CROSS-REFERENCE TO RELATED APPLICATION

This application claims priority to provisional application Ser. No. 60/827,792, filed Oct. 2, 2006.

BACKGROUND OF THE INVENTION

1. Field of the Invention

The present invention relates to remediation of bodies of water, and, more particularly, to wetland technologies for such remediation.

2. Description of Related Art

Constructed and natural wetlands are commonly used for removing pollutants from wastewaters and surface waters. Within such "treatment" wetlands, many of the water-borne pollutants such as phosphorus and most metals are assimilated by biota or sequestered chemically. As the biota senesce and decompose over time, the sediments become the ultimate reservoir for these contaminants. It is important to note that natural wetlands typically accrete soils; so this gradual accumulation of sediments and associated constituents is a natural process. However, in wetlands that are intentionally used for removing contaminants from waters, the pollutant concentrations in the newly accreted sediments can exceed those of natural soil constituent levels, and the new sediments become somewhat enriched with pollutants. Additionally, depending on the type of aquatic vegetation (e.g., algae, floating plants, emergent plants) that occurs in the treatment wetland, the new sediments that accrete may exhibit physical characteristics (e.g., lower bulk density) that differ markedly from those of the native wetland soils.

Treatment wetlands frequently exhibit horizontal and vertical gradients in sediment pollutant concentrations and sediment accrual rates. The inflow region of the wetland, where concentrations of pollutants often are highest, typically exhibits greater sediment accumulation rates, and also higher concentrations of sediment pollutants than does the wetland outflow region. The gradual accumulation of sediments over time also results in vertical concentration gradients within the soil, with highest pollutant concentrations occurring in surficial sediments, and pollutant concentrations declining with sediment/soil depth.

One typical consequence of the accumulation of "contaminated" sediments within a wetland is a gradual impairment in treatment performance over time, since a flux of dissolved contaminants to the water column can occur from recently deposited, "enriched" sediments. Removal rates for some water-borne constituents, such as phosphorus (P), therefore may decline over time as the treatment wetland ages.

Several remedies have been proposed to rejuvenate treatment wetland sediments, and to restore the effectiveness of "old" treatment wetlands for removing water-borne pollutants. These techniques are comparable to those that have been utilized to rejuvenate lake and reservoir sediments. Addition of soil amendments, such as chemical coagulants, potentially can help stabilize and sequester sediment pollutants in water bodies. Bulk removal of accrued sediments also has been performed to reduce the volume of sediments, and mass of associated pollutants, from wetlands, lakes, and reservoirs.

While not commonly used for modifying water body sediments, fibrous organic matter amendments, such as wheat straw, have been applied to farm field soils to influence the mobility and bioavailability of constituents such as phosphorus.

Because treatment wetlands are a land-intensive treatment technology, the addition of amendments to immobilize soil pollutants, such as coagulants or organic matter, can be costly.

Therefore, it would be beneficial to provide a system and method for inexpensively amending soils and sediments.

SUMMARY OF THE INVENTION

The present invention addresses the need for a technology that can amend treatment wetland soils and sediments in order to reduce pollutant export following the use of the wetland for contaminant removal.

The method includes the steps of draining at least a portion of a water body and permitting the growth of vegetation on the sediments. Once grown, the resulting biomass is tilled into the soil, and the water body is permitted to re-hydrate. In some instances a portion of the vegetation can be harvested prior to tilling remaining crop residues into the soil.

In another embodiment the draining step occurs naturally, such as part of a weather cycle, or during drought conditions.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWING

THE FIGURE is a flowchart of an exemplary method of the present invention.

DETAILED DESCRIPTION OF THE PREFERRED EMBODIMENTS

A description of the preferred embodiments of the present invention will now be presented with reference to THE FIGURE.

The present system and method 100 are directed to an inexpensive technique for amending wetland, lake, or reservoir soils and sediments, for at least reducing pollutant export and improving the physical texture of the soils and sediments. The technique can be used in substantially any water body, or portion of a water body, that can be drained periodically.

The method comprises the steps of draining at least a portion of a water body (block 101). This draining can be carried out by removing water, or can occur naturally as a result of local climate conditions. The water body can contain existing wetland/aquatic vegetation. The water body sediments and wetland/aquatic vegetation are permitted to dry (block 102), and vegetation is permitted to proliferate thereon (block 103). The vegetation can comprise natural terrestrial or moisture-tolerant vegetation, with the type dependent upon the water content of the sediments. Alternatively, the vegetation can comprise a planted "cover" crop, possibly following appropriate preparation of the soil.

When the vegetation has attained a desired standing crop biomass (block 104), the plant biomass is tilled into the soil (block 106). The tilling process serves to transfer "contaminated" surficial sediments to lower soil depths, effectively burying them, and also to mix the plant biomass into the soil. The plant root and foliage biomass serves as a carbon source for soil micro-biota. As the soil microorganisms gradually break down the plant tissues, they immobilize available nutrients in the soil during the decomposition process, which helps minimize a flux of soil nutrients and other pollutants to the water column. Following the tilling of the biomass, the water body is allowed to re-hydrate (block 107).

In many cases it may be desirable to plant a productive crop into the dried water body sediments that produces foliage and/or below-ground tissues that optimize the sequestration of sediment pollutants. For example, a crop that produces fibrous tissues, in which much of the cell wall material is recalcitrant, with low nitrogen (N) and P contents, contributes to improving the physical structure of the soil, and also acts as a good substrate for the microbial immobilization of soil nutrients owing to its wide carbon-to-nitrogen and carbon-to-phosphorus ratios. Plants that can prove suitable for this purpose include, but are not intended to be limited to, sugarcane (Saccharum) and reeds (Phragmites, Arundo). In some instances, it may be desirable to harvest a portion of the crop (block 105), for example, for economic benefit, and till the remaining crop residues into the soil.

The method of the present invention can be used periodically (block 108) for the remediation of wetland sediments and soils, and for lake and reservoir sediments. The method can be useful when used in conjunction with a water body remediation technique that entails the periodic drying down of the water body and tilling of existing aquatic vegetation for purposes of nutrient removal. Aquatic plants, particularly floating and submerged species, typically are labile (i.e., decompose quickly), and contribute little recalcitrant carbon to the soils. The periodic cultivation and tilling of a fibrous crop therefore enhances soil pollutant retention and improves soil physical characteristics.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A method for bioremediating a body of water and associated soils and sediments comprising the steps of:
    (a) draining at least a portion of a body of water;
    (b) permitting remaining sedementary and vegetative material to dry on a bottom of the body of water;
    (c) permitting new vegetation to proliferate;
    (d) tilling the new vegetation into the water body bottom; and
    (e) re-hydrating the body of water.

2. The method recited in claim 1, wherein the new vegetation comprises at least one of terrestrial and moisture-tolerant vegetation.

3. The method recited in claim 1, wherein the vegetative material comprises wetland vegetation.

4. The method recited in claim 1, wherein step (c) comprises planting a cover crop.

5. The method recited in claim 4, further comprising the step, prior to the planting step, of preparing soil in the water body bottom to receive the cover crop.

6. The method recited in claim 4, wherein the cover crop comprises vegetation adapted to sequester sediment pollutants.

7. The method recited in claim 4, wherein the cover crop comprises a fibrous crop.

8. The method recited in claim 4, further comprising the steps, following the planting step, of:
    permitting the cover crop to mature; and
    harvesting at least a portion of the mature crop.

9. The method recited in claim 1, wherein steps (a)-(e) are repeated at a desired interval.

10. A method for bioremediating a body of water and associated soils and sediments comprising the steps of:
    (a) permitting existing sedementary and vegetative material to dry on a bottom of a drained body of water;
    (b) permitting new vegetation to proliferate;
    (c) tilling the new vegetation into the water body bottom; and
    (d) permitting the body of water to re-hydrate.

11. The method recited in claim 10, wherein the new vegetation comprises at least one of terrestrial and moisture-tolerant vegetation.

12. The method recited in claim 10, wherein the vegetative material comprises wetland vegetation.

13. The method recited in claim 10, wherein step (b) comprises planting a cover crop.

14. The method recited in claim 13, further comprising the step, prior to the planting step, of preparing soil in the water body bottom to receive the cover crop.

15. The method recited in claim 13, wherein the cover crop comprises vegetation adapted to sequester sediment pollutants.

16. The method recited in claim 13, wherein the cover crop comprises a fibrous crop.

17. The method recited in claim 13, further comprising the steps, following the planting step, of:
    permitting the cover crop to mature; and
    harvesting at least a portion of the mature crop.

* * * * *